United States Patent
Kochelek et al.

(10) Patent No.: US 10,486,006 B2
(45) Date of Patent: Nov. 26, 2019

(54) REDUNDANT VENTS WITH UNITARY VALVE BODIES FOR WATER-BASED FIRE SPRINKLER SYSTEMS

(71) Applicant: ENGINEERED CORROSION SOLUTIONS, LLC, St. Louis, MO (US)

(72) Inventors: Jeffrey T. Kochelek, St. Louis, MO (US); Adam H. Hilton, St. Louis, MO (US)

(73) Assignee: Engineered Corrosion Solutions, LLC, St. Louis, MO (US)

( * ) Notice: Subject to any disclaimer, the term of this patent is extended or adjusted under 35 U.S.C. 154(b) by 0 days.

(21) Appl. No.: 15/558,876

(22) PCT Filed: Mar. 18, 2016

(86) PCT No.: PCT/US2016/023230
§ 371 (c)(1),
(2) Date: Sep. 15, 2017

(87) PCT Pub. No.: WO2016/149656
PCT Pub. Date: Sep. 22, 2016

(65) Prior Publication Data
US 2018/0064976 A1     Mar. 8, 2018

Related U.S. Application Data (60) Provisional application No. 62/135,010, filed on Mar. 18, 2015.

(51) Int. Cl.
*F16K 31/18* (2006.01)
*A62C 35/68* (2006.01)
(Continued)

(52) U.S. Cl.
CPC .............. *A62C 35/68* (2013.01); *F16K 31/18* (2013.01); *F16L 55/07* (2013.01); *A62C 35/60* (2013.01); *A62C 35/62* (2013.01)

(58) Field of Classification Search
CPC .......... F16K 31/18; F16K 31/22; F16K 31/24; F16K 31/26; F16K 31/265; F16K 24/042;
(Continued)

(56) References Cited

U.S. PATENT DOCUMENTS

| 5,613,513 A | 3/1997 | Makowan |
|---|---|---|
| 8,636,023 B2 | 1/2014 | Burkhart et al. |

(Continued)

FOREIGN PATENT DOCUMENTS

| WO | 2011/056580 A2 | 5/2011 |
|---|---|---|
| WO | 2011/162988 A2 | 12/2011 |

(Continued)

*Primary Examiner* — Ian G Paquette
(74) *Attorney, Agent, or Firm* — Husch Blackwell LLP (57) ABSTRACT

One example of a redundant vent for a water-based fire sprinkler system having a pipe network includes a unitary valve body defining a primary valve chamber and a redundant valve chamber, a primary float valve positioned within the primary valve chamber, and a redundant float valve positioned within the redundant valve chamber. The primary float valve and the primary valve chamber form a primary gas vent. The redundant float valve and the redundant valve chamber form a redundant gas vent. The primary gas vent is coupled to the redundant gas vent. The primary gas vent and the redundant gas vent are each configured to vent gas but not water from the pipe network when the redundant vent is coupled to the pipe network. Various optional features, components and water-based fire sprinkler systems are also disclosed.

22 Claims, 9 Drawing Sheets

(51) Int. Cl.
  *F16L 55/07*    (2006.01)
  *A62C 35/60*    (2006.01)
  *A62C 35/62*    (2006.01)

(58) Field of Classification Search
  CPC ...... F16K 24/044; F16K 24/048; F16K 24/06;
       F16L 55/07; A62C 35/62; A62C 35/60;
                          A62C 35/68
  See application file for complete search history.

(56)  References Cited

U.S. PATENT DOCUMENTS

| | | | |
|---|---|---|---|
| 2006/0243459 A1 | 11/2006 | Jackson | |
| 2009/0272549 A1* | 11/2009 | Feenstra | F16K 31/128 169/17 |
| 2011/0094758 A1* | 4/2011 | Burkhart | A62C 35/62 169/17 |
| 2011/0226495 A1 | 9/2011 | Burkhart et al. | |
| 2014/0182702 A1 | 7/2014 | Burkhart et al. | |
| 2014/0202714 A1 | 7/2014 | Burkhart et al. | |
| 2014/0251449 A1* | 9/2014 | Chen | F16K 47/02 137/115.2 |
| 2015/0021052 A1 | 1/2015 | Kochelek | |
| 2015/0083441 A1 | 3/2015 | Kochelek et al. | |
| 2016/0298779 A1* | 10/2016 | Heiman | E03F 5/08 |

FOREIGN PATENT DOCUMENTS

| | | |
|---|---|---|
| WO | 2013/052551 A2 | 4/2013 |
| WO | 2013/181596 A1 | 12/2013 |
| WO | 2015/134914 A1 | 9/2015 |

* cited by examiner

REDUNDANT VENTS WITH UNITARY VALVE BODIES FOR WATER-BASED FIRE SPRINKLER SYSTEMS

CROSS-REFERENCE TO RELATED APPLICATION

This application is a PCT International Application and claims priority to U.S. Patent Application No. 62/135,010 filed Mar. 18, 2015. The entire disclosure of the above application is incorporated herein by reference.

FIELD

The present disclosure relates to redundant vents with unitary valve bodies for water-based fire sprinkler systems.

SUMMARY

This section provides a general summary of the disclosure, and is not a comprehensive disclosure of its full scope or all of its features.

According to one aspect of the present disclosure, a redundant vent for a water-based fire sprinkler system having a pipe network is disclosed. The redundant vent includes a unitary valve body defining a primary valve chamber and a redundant valve chamber, a primary float valve positioned within the primary valve chamber, and a redundant float valve positioned within the redundant valve chamber. The primary float valve and the primary valve chamber form a primary gas vent. The redundant float valve and the redundant valve chamber form a redundant gas vent. The primary gas vent is coupled to the redundant gas vent. The primary gas vent is configured to vent gas but not water from the pipe network when the redundant vent is coupled to the pipe network. The redundant gas vent is also configured to vent gas but not water from the pipe network when the redundant vent is coupled to the pipe network.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation(s) depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
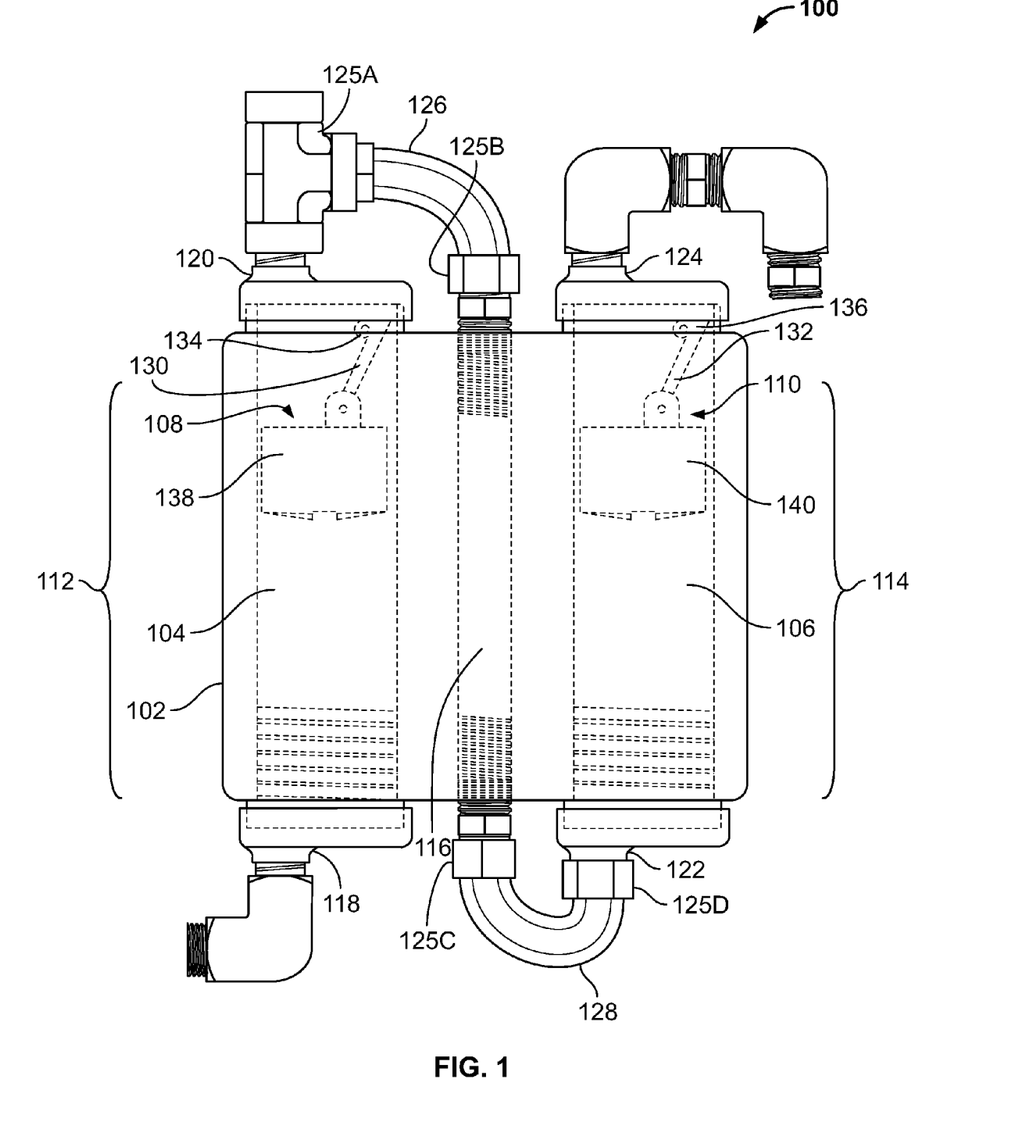
FIG. 1 is a front partial phantom view of a redundant vent including a unitary valve body according to one example embodiment of the present disclosure.

A redundant vent for a water-based fire sprinkler system having a pipe network according to one example embodiment of the present disclosure is illustrated in FIG. 1 and indicated generally by reference number 100. As shown in FIG. 1, the redundant vent 100 includes a unitary valve body 102 defining a primary valve chamber 104 and a redundant valve chamber 106, a primary float valve 108 positioned within the primary valve chamber 104, and a redundant float valve 110 positioned within the redundant valve chamber 106. The primary float valve 108 and the primary valve chamber 104 form a primary gas vent 112, and the redundant float valve 110 and the redundant valve chamber 106 form a redundant gas vent 114. As shown in FIG. 1, the primary gas vent 112 is coupled to the redundant gas vent 114. The primary gas vent 112 and the redundant gas vent 114 are each configured to vent gas but not water from the pipe network of the water-based fire sprinkler system when the redundant vent 100 is coupled to the pipe network.

The float valves 108, 110 each include floats 138, 140 having a density lower than water, levers 130, 132 coupled to the floats 138, 140, and seats 134, 136 coupled to the floats 138, 140 via the levers 130, 132, respectively. The floats 138, 140 are preferably corrosion-resistant, and the seats 134, 136 are preferably soft seats formed of rubber or plastic. Alternatively, other suitable floats and/or seats may be employed.

The primary valve chamber 104 includes an inlet 118 and an outlet 120, and the redundant valve chamber 106 includes an inlet 122 and an outlet 124. The inlet 118 of the primary valve chamber 104 is preferably coupled to the pipe network of a water-based fire sprinkler system via one or more pipe fittings, as discussed further below. The outlet 124 of the redundant valve chamber 106 may be open to atmosphere or coupled to one or more other components, as further explained below.

As shown in FIG. 1, the outlet 120 of the primary valve chamber 104 is coupled to the inlet 122 of the redundant valve chamber 106 via pipe fittings 125a-125d, conduits 126, 128 and a connecting chamber 116 extending through and defined by the valve body 102. Alternatively, the outlet 120 of the primary valve chamber 104 may be coupled to the inlet 122 of the redundant valve chamber 106 in another suitable manner. For example, the connecting chamber 116, pipe fittings 125b, 125c and conduits 126, 128 could be replaced by a single conduit extending on an exterior side of the unitary valve body 102 between pipe fittings 125a and 125d.

The conduit(s), when employed, may include flexible and/or rigid conduit formed of plastic polymer(s) (e.g., PVC, rubber, etc.), stainless steel and/or other suitable materials.

When the redundant vent 100 is coupled to the pipe network of a fire sprinkler system and the pipe network is filled with water, gas can exit the pipe network through the redundant vent 100 until water reaches the primary gas vent 112 and causes the float valve 108 to close (i.e., due to the water lifting the float 138, causing the seat 134 to seal against an orifice). This action prohibits water from passing through the primary gas vent 112. The redundant gas vent 114 is preferably designed to function in the same manner as the primary gas vent 112.

As explained above, the primary gas vent 112 and the redundant gas vent 114 are plumbed in series. This configuration provides redundancy in preventing water from exiting the pipe network of a fire sprinkler system. For example, if the primary gas vent 112 malfunctions or fails and allows water to pass, the redundant gas vent 114 will prevent this water from exiting the pipe network. This redundant configuration should obviate any need to plumb an outlet of the redundant vent 100 to a drain, and allows for installation of the redundant vent 100 in sensitive environments (e.g., above hard ceilings and/or in server rooms, archive storage rooms, libraries, museums, etc.

In the embodiment of FIG. 1, the unitary valve body 102 preferably has a monolithic construction. For example, the unitary valve body 102 including the primary valve chamber 104, the redundant valve chamber 106 and the connecting chamber 116 (when employed) may be formed from a single piece of aluminum, plastic or other material via casting (e.g., filling a mold with a liquid material and allowing the material to solidify, etc.), or milling (which may include drilling, threading, etc.). Alternatively, the unitary valve body 102 may be formed from multiple parts (which may each have a monolithic construction) that are permanently joined together using welds, adhesives or other suitable means, or detachably coupled together via fasteners.

Figure 2:
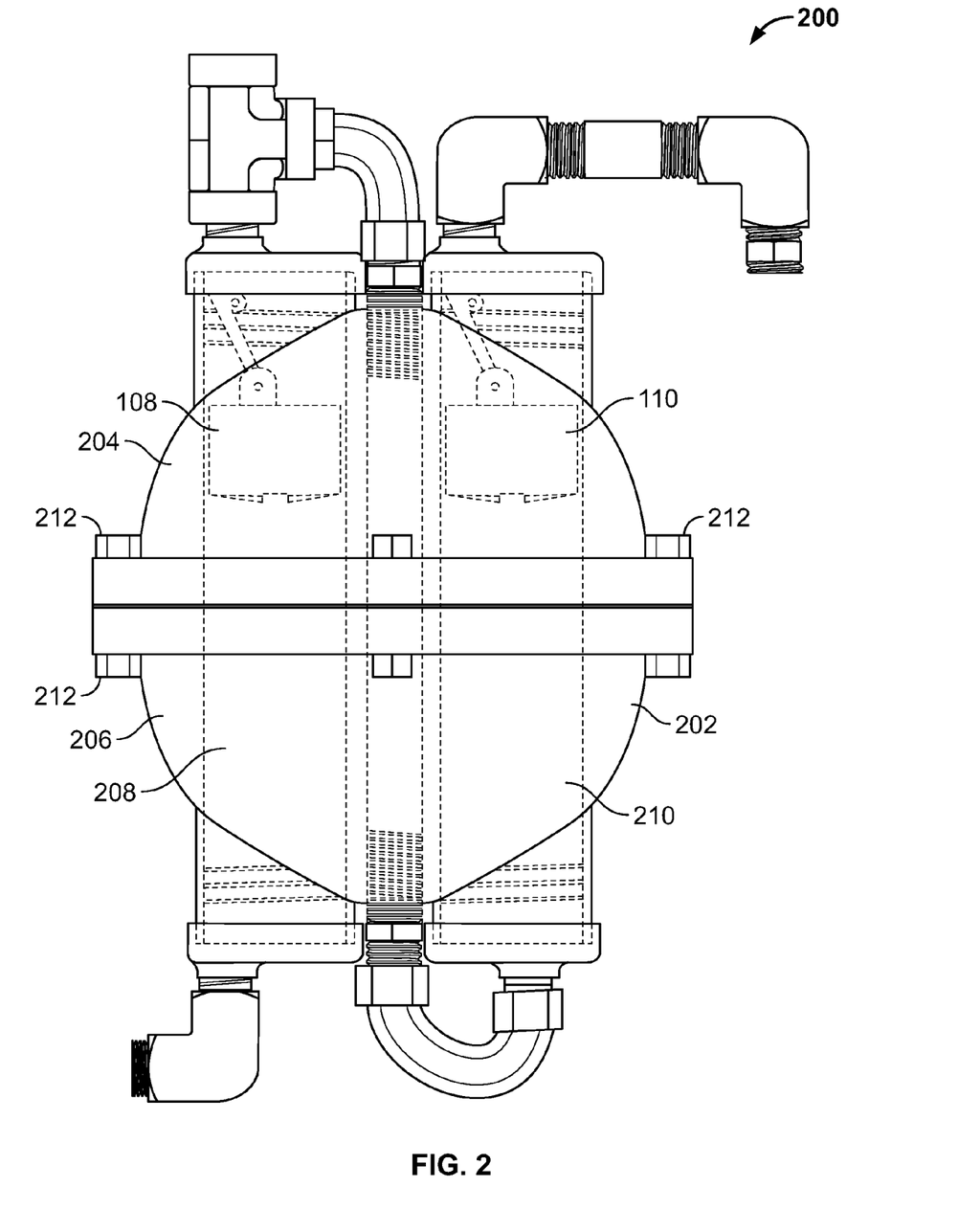
FIG. 2 is a front partial phantom view of a redundant vent including a unitary valve body having a two-piece construction according to another example embodiment.

For example, FIG. 2 illustrates a redundant vent 200 similar to the redundant vent 100 of FIG. 1, but includes a unitary valve body 202 having a two-piece construction including an upper body portion 204 and a lower body portion 206. The unitary valve body 202 includes primary and redundant valve chambers 208, 210 collectively defined by the upper body portion 204 and the lower body portion 206 (i.e., with the upper and lower body portions 204, 206 each defining a portion of the primary and redundant valve chambers 208, 210).

The upper and lower body portions 204, 206 may be detachably coupled together with one or more mechanical fasteners 212 (e.g., bolts, screws, etc.) to facilitate future service or replacement of components within the unitary valve body 202, such as the floats 108, 110. The upper and/or lower body portions 204, 206 may also include a hinge (not shown) for providing a clam shell configuration. Alternatively, the upper and lower body portions 204, 206 may be permanently joined together using welds, adhesives, rivets, or other suitable means. If desired, a seal (such as an O-ring or gasket) may be positioned between mating surfaces of the upper and lower body portions 204, 206.

Figure 3:
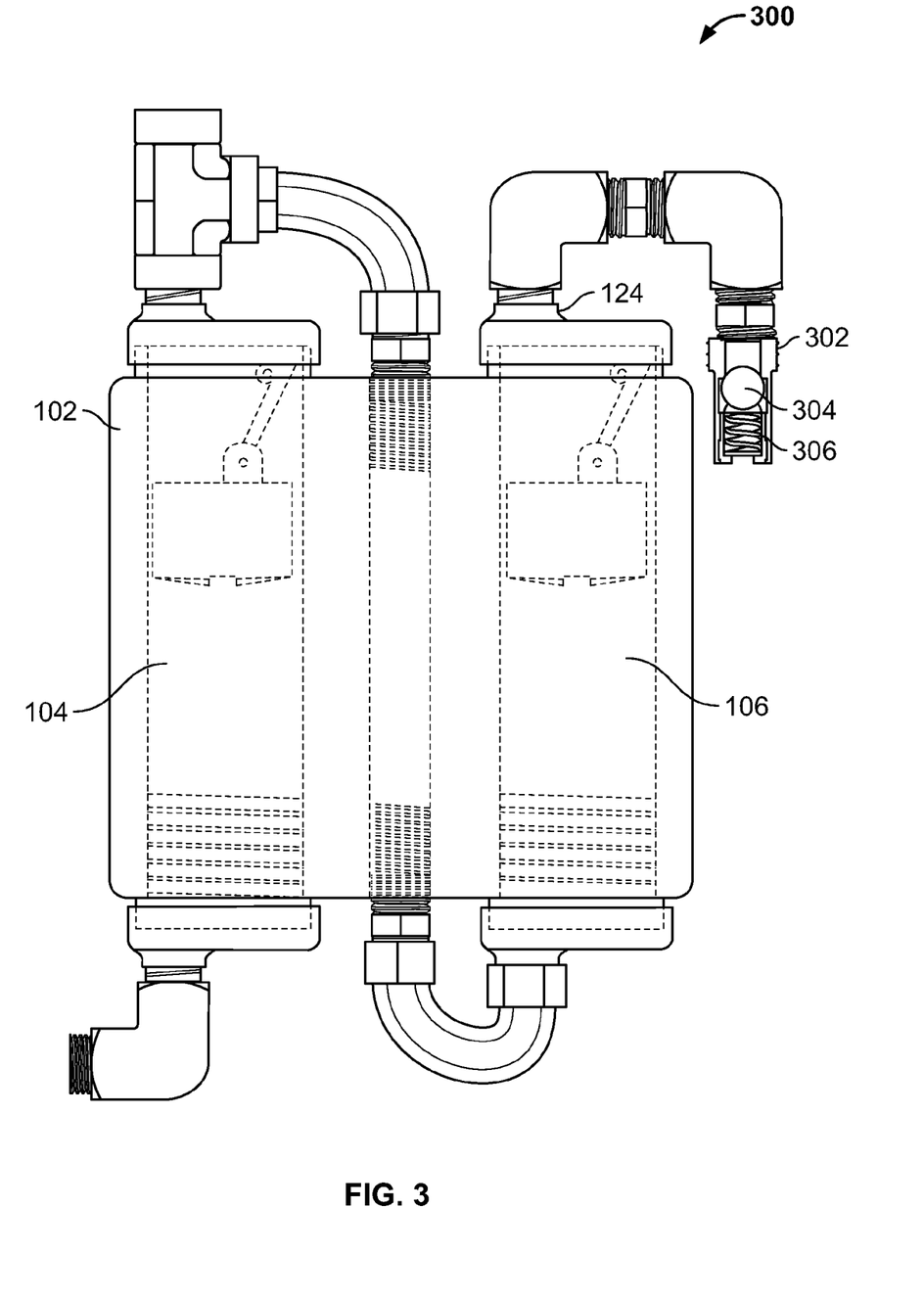
FIG. 3 is a front partial phantom view of a redundant vent including a unitary valve body and a ball check valve according to yet another example embodiment.

Each redundant vent described herein may include one or more check valves (e.g., two port valves) positioned on the outlet side of the redundant gas vent to prevent ambient air (i.e., oxygen rich air) from entering the pipe network of a fire sprinkler system via the redundant vent, and/or to retain gas (e.g., pressurized air or purified nitrogen) in the pipe network. For example, FIG. 3 illustrates a redundant vent 300 including a ball check valve 302 (e.g., having a ball 304 and a spring 306 for biasing the ball 304 into a closed position) operatively coupled to the outlet 124 of the redundant valve chamber 106. The ball check valve 302 allows gas to exit the pipe network via the redundant vent 300 as the pipe network is filled with water, but prevents ambient air from entering the pipe network via the redundant vent 300.

Figure 4:
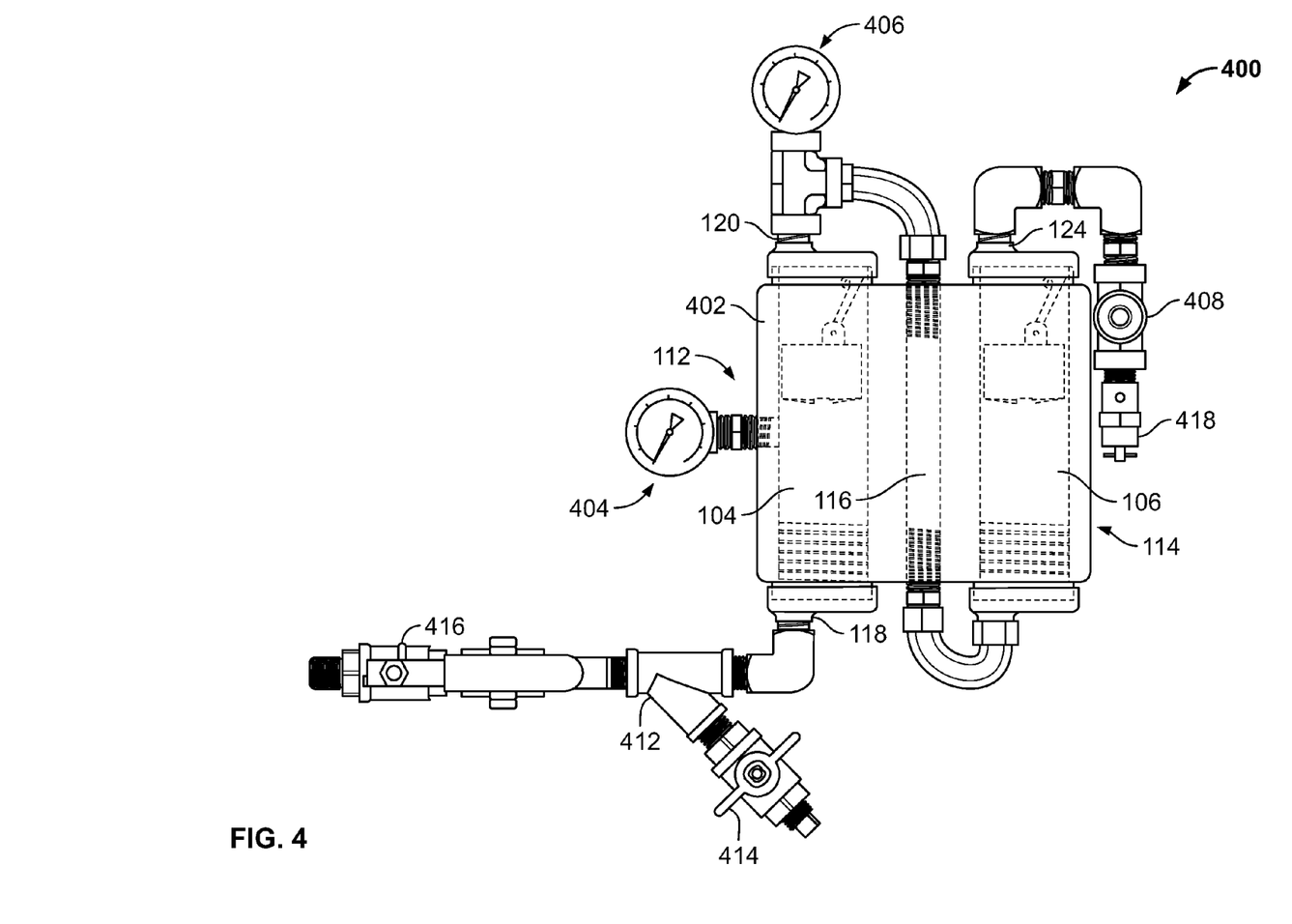
FIG. 4 is a front partial phantom view of a redundant vent including a unitary valve body and a pressure relief valve according to another example embodiment.

Similarly, FIG. 4 illustrates a redundant vent 400 including a pressure relief valve 418 operatively coupled to the outlet 124 of the redundant valve chamber 106. The pressure relief valve 418 is configured to open when the back pressure (e.g., the pressure at the outlet 124) exceeds a set pressure limit of the pressure relief valve 418, such as about 40 psi, 50 psi, 60 psi, etc. Accordingly, the pressure relief valve 418 will be closed when the pipe network is pressurized with gas (e.g., purified nitrogen) below the set pressure limit, but will open as the pipe network is filled with water at a pressure above the set pressure limit. The pressure relief valve also prevents ambient air from entering the pipe network via the redundant vent 400.

Figure 5:
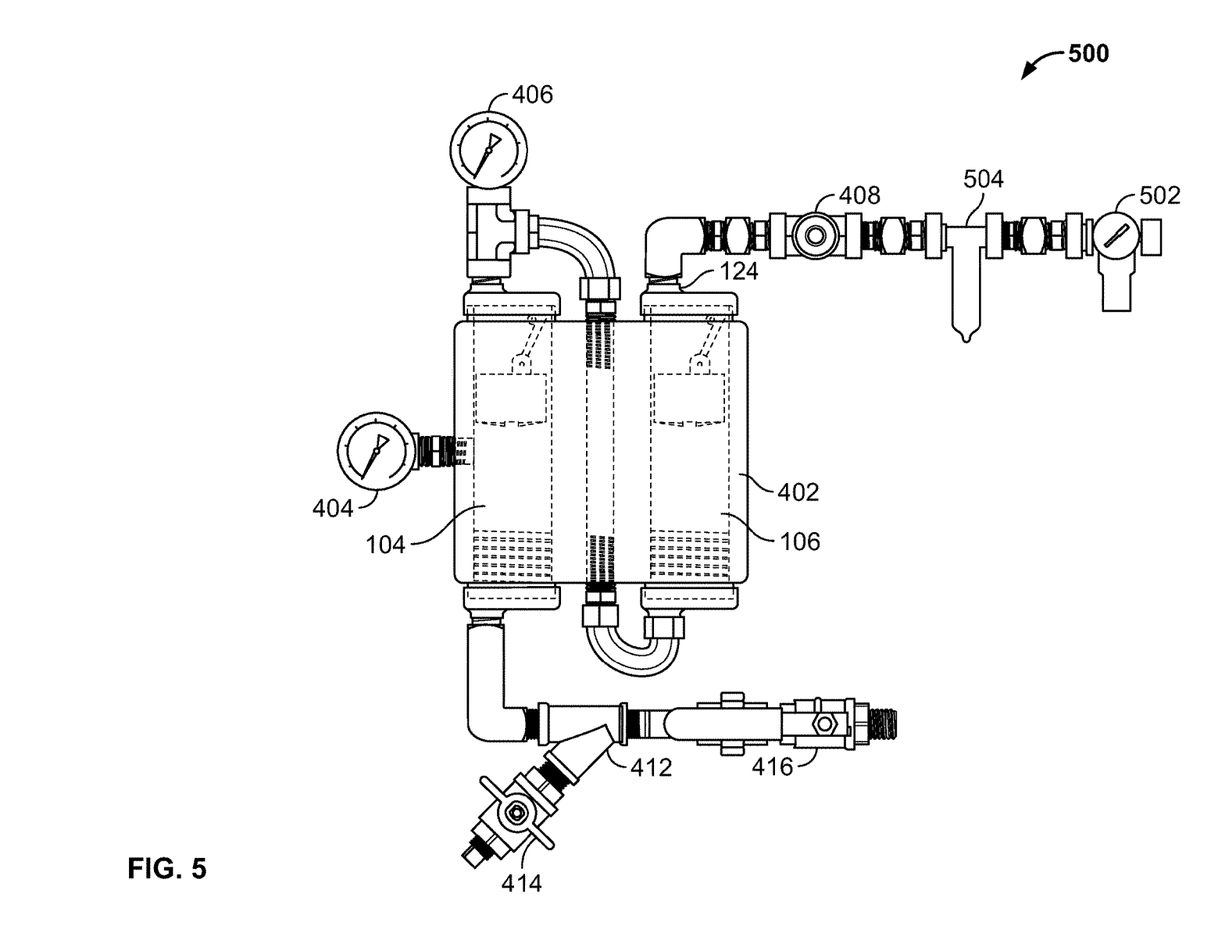
FIG. 5 is a front partial phantom view of a redundant vent including a unitary valve body and an adjustable back pressure regulator according to yet another example embodiment.

As another example, FIG. 5 illustrates a redundant vent 500 including an adjustable back pressure regulator 502 operatively coupled to the outlet 124 of the redundant valve chamber 106. The adjustable back pressure regulator operates in a manner similar to the pressure relief valve 418 of FIG. 4, but has an adjustable pressure limit. The adjustable back pressure regulator may include a pressure gauge (e.g., an analog or digital display) for displaying the back pressure (e.g., the pressure at the outlet 124) and facilitating adjustment of the back pressure limit by a user. In some embodiments, the adjustable back pressure regulator has an adjustable pressure limit range of about zero to about 150 psi. If the redundant vent 500 is employed in a dry pipe system, the pressure limit of the adjustable back pressure regulator 502 can be set above the minimum supervisory pressure to prevent the redundant vent 500 from tripping or actuating the dry pipe system.

Figure 6:
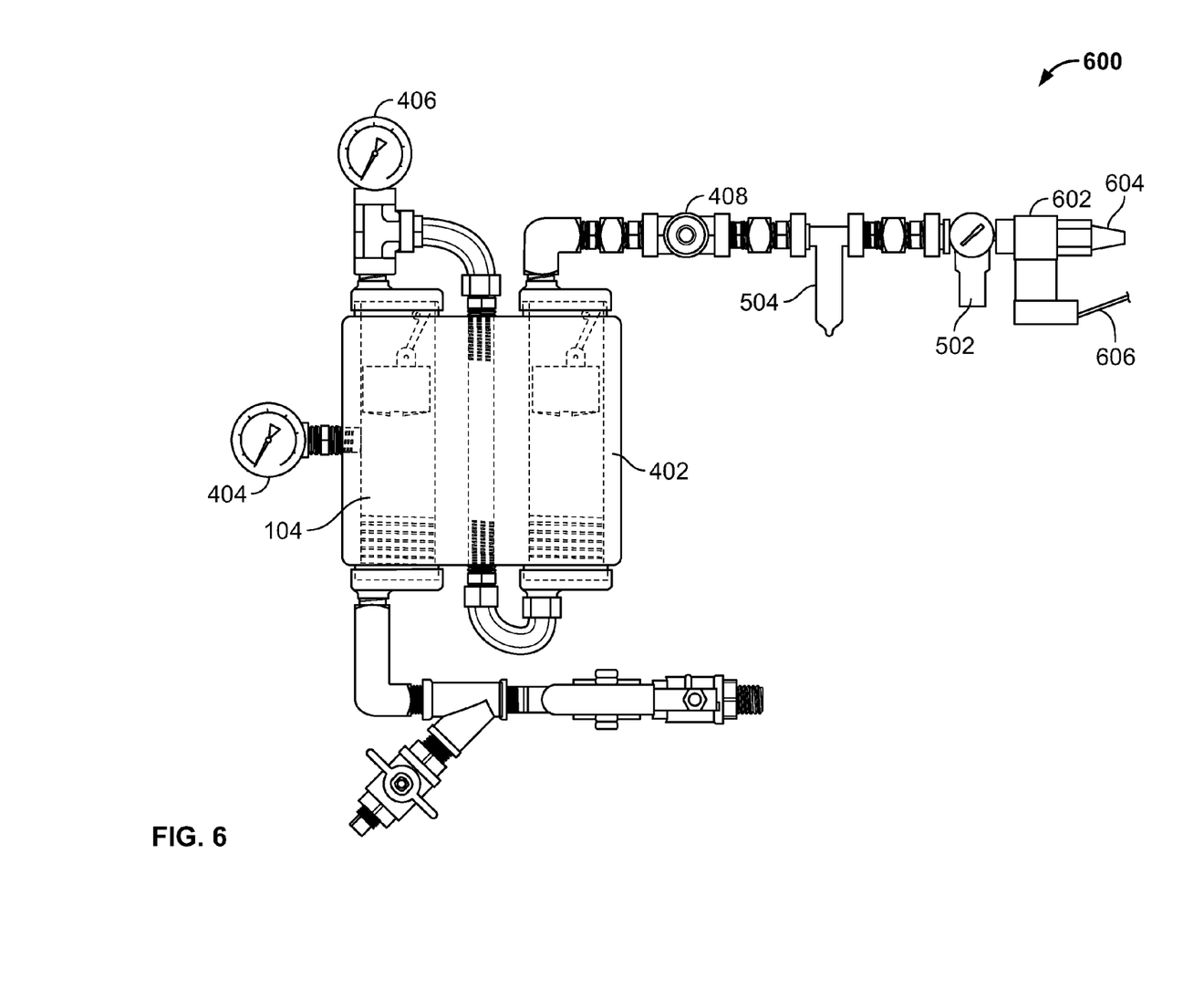
FIG. 6 is a front partial phantom view of the redundant vent of FIG. 5 having an orifice for controlling the discharge rate of gas according to another example embodiment.

FIG. 6 illustrates a redundant vent 600 similar to the vent 500 of FIG. 5, but further includes an orifice 604 operatively coupled to the adjustable back pressure regulator 502 for controlling the discharge rate of gas. The size of the orifice 604 may be selected as desired for any given implementation. For some implementations, the diameter of the orifice 604 may range from about 0.004 inches to about 0.125 inches.

As shown in FIG. 6, the redundant vents disclosed herein may also include a solenoid valve 602 for selectively preventing the discharge of gas. For example, the solenoid valve 602 may be closed after a defined period of time, when gas exiting the redundant vent has a target purity level (such as 98% nitrogen or 2% oxygen), upon detecting a failure of the redundant gas vent, etc. The solenoid valve 602 may be coupled to a controller (not shown), which may include a timer, via a cable 606.

The redundant vents described herein may include various other components, including filters, pressure gauges, gas sampling ports, valves, etc. For example, any of the redundant vents may include a gas sampling port 408, preferably positioned on an output side of the redundant vent as shown in FIGS. 4-6, to facilitate measuring the concentration of one or more gases flowing through and exiting the redundant vent.

Further, the various redundant vents may each include various other pipe fittings for coupling the redundant vent to a pipe network. For example, any of the redundant vents may include an isolation ball valve 416, a "Y" strainer 412 coupled between the isolation ball valve 416 and the inlet of the primary valve chamber 104, and a drain valve 414 coupled to the strainer 412 as shown in FIGS. 4-6. The isolation ball valve 416 can be closed as necessary for service or removal of a redundant vent coupled to a pipe network pressurized with water or gas. The "Y" strainer 412 may include a mesh screen (or another suitable filter) to prevent debris from plugging orifice(s) of the redundant vent. The drain valve 414 may be opened to drain water, debris, etc. from the redundant vent, the pipe network, etc.

Additionally (or alternatively), the redundant vents may include a filter 504 positioned upstream of a pressure relief valve or an adjustable back pressure regulator as shown, e.g., in FIGS. 5 and 6, to prevent particles from entering the pressure relief valve or adjustable back pressure regulator.

Further, the redundant vents may include one or more pressure gauges (in addition to the pressure gauge of an adjustable back pressure regulator, when employed) for measuring and monitoring pressures at various points in the redundant vent and/or the pipe network. For example, any of the redundant vents may include a pressure gauge 404 operatively coupled to the inlet of the primary gas vent, as shown in FIGS. 4-6, for monitoring pressure on the inlet side of the redundant vent.

In the particular examples of FIGS. 4-6, the unitary valve body 402 defines a chamber for receiving the pressure gauge 404. This chamber extends between an edge surface of the unitary valve body 402 and the primary valve chamber 104, and intersects the primary valve chamber below the primary float valve to monitor pressure on the inlet side of the redundant vent. Alternatively, the pressure gauge 404 may be positioned in another suitable location and/or coupled to the redundant vent in another suitable manner without departing from the scope of this disclosure.

Any of the redundant vents may also (or instead) include a pressure gauge 406 operatively coupled to the outlet of the primary gas vent, as shown in FIGS. 4-6, for monitoring pressure downstream of the primary gas vent, and upstream of the redundant gas vent. The pressure gauge 406 may be used to detect a malfunction or failure of the primary gas vent.

The redundant vents disclosed herein may also be configured to communicate one or more sensed parameters to a monitoring device and/or receive one or more control signals from a monitoring device as disclosed in International Application No. PCT/US2015/019267 filed Mar. 6, 2015. The entire disclosure of this application is incorporated herein by reference.

The unitary valve bodies disclosed herein may include any suitable material. For example, the unitary valve bodies may include metal (e.g., aluminum, steel, etc.), plastic, composite material(s), etc. Further, the unitary valve bodies may be mass produced by utilizing a milling process, a casting process, etc. as explained above.

Additionally, the various chambers disclosed herein may extend from one edge surface of a unitary valve body to another edge surface of the unitary valve body. In some embodiments, each chamber of a redundant vent may extend between the same edge surfaces of the unitary valve body. In other embodiments, each chamber may extend between different edge surfaces of the unitary valve body.

In addition, one or more chambers of each redundant vent disclosed herein can be threaded adjacent a top portion and/or a bottom portion (e.g., near opposing edge surfaces of the valve body). Likewise, one or more of the float valves, couplings (e.g., endcaps, etc.), conduits, etc. of each redundant vent can be threaded. As such, the float valves, couplings, conduits, etc. may be screwed to and/or unscrewed from the chambers, etc. for easy assembly and/or disassembly. Thus, float valves and/or other components can be installed and replaced (if and when necessary) with ease.

It should be understood that various optional components shown in the figures may be eliminated from a particular redundant vent and/or system if desired, and the various components can be coupled together in a different order or arrangement than those shown in the figures.

By utilizing a unitary valve body that defines a primary valve chamber, a redundant valve chamber, and a connecting chamber (when employed), each redundant vent disclosed herein may have a smaller size as compared to prior art vents. In some embodiments, the redundant vents may be about one third the size of comparable prior art vents. This smaller size simplifies the handling, installation and servicing (when necessary) of the redundant vents, and provides greater placement flexibility. For example, the redundant vents disclosed herein may be installed in various locations of a water-based fire sprinkler system that cannot be utilized by prior art vents due to size constraints.

Additionally, the redundant vents disclosed herein may have fewer components, take less time to manufacture, weigh less, etc. compared to other known redundant vents. As such, the cost of manufacturing, shipping, installing, servicing, etc. the redundant vents of the present disclosure may be considerably less than other known redundant vents. Further, due to the reduced number of components, the redundant vents of the present disclosure may have fewer points of failure as compared to prior art vents, and should therefore be much less likely to leak water.

As noted above, the redundant vents disclosed herein are each designed for coupling to the pipe network of a water-based fire sprinkler system, including wet pipe systems and dry pipe (including preaction) systems. The redundant vents and sprinkler systems may be installed, configured and/or used as described in U.S. Pat. No. 8,636,023 issued Jan. 28, 2014, U.S. application Ser. No. 13/048,596 filed Mar. 15, 2011, U.S. Provisional Application No. 61/357,297 filed Jun. 22, 2010, International Application No. PCT/US2011/040003 filed Jun. 10, 2011, U.S. application Ser. No. 14/556,642 filed Dec. 1, 2014, U.S. Provisional Application No. 61/992,590 filed May 13, 2014, International Application No. PCT/US2010/054108 filed Oct. 26, 2010, and International Application No. PCT/US2012/058567 filed Oct. 3, 2012. The entire disclosures of these applications are incorporated herein by reference.

Figure 7:
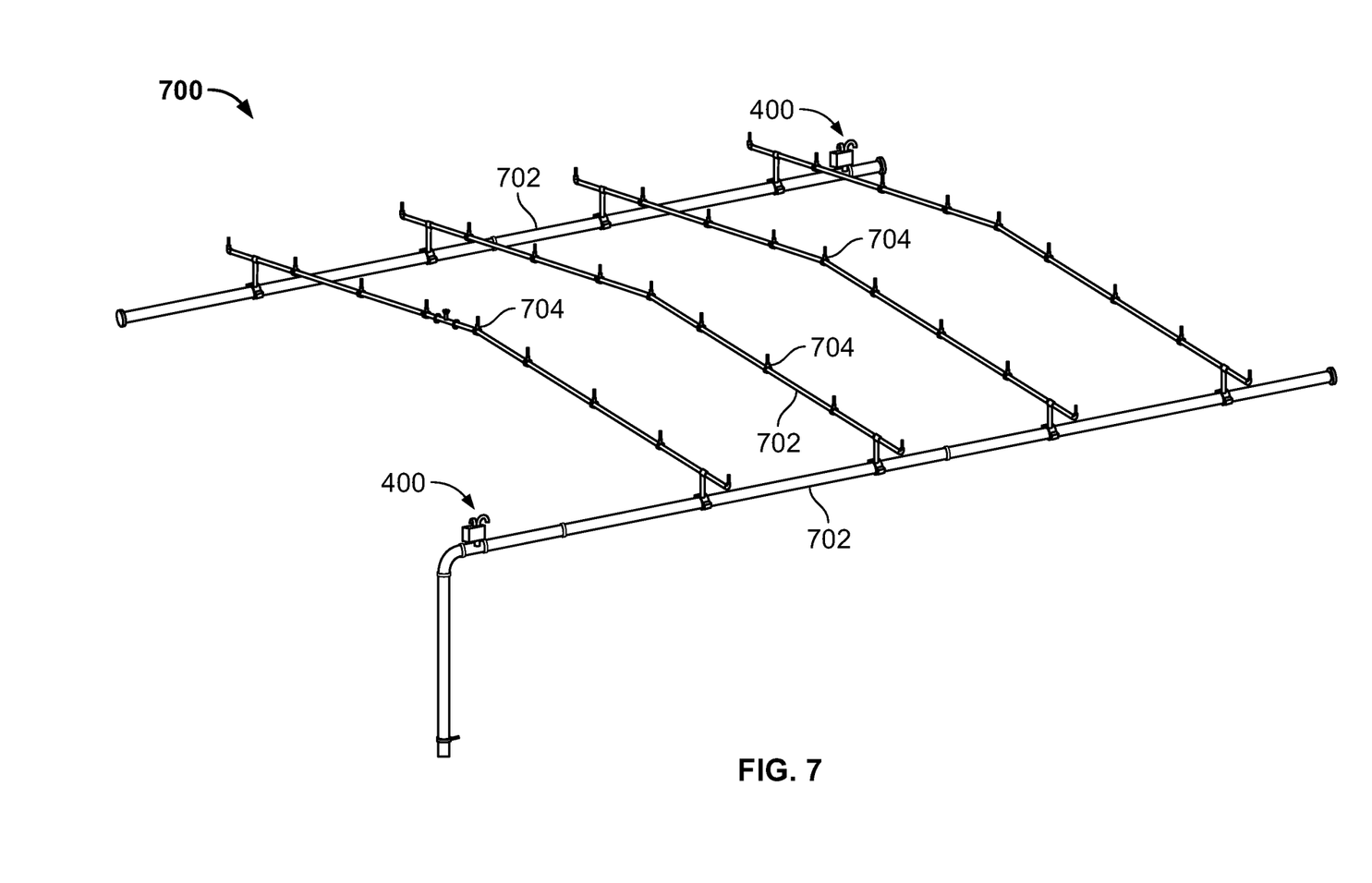
FIG. 7 is an isometric view of a wet pipe fire sprinkler system including the redundant vent of FIG. 4 according to yet another example embodiment.

FIG. 7 illustrates one example of a wet pipe fire sprinkler system 700 including a pipe network 702, various sprinklers 704 coupled to the pipe network 702, and two redundant vents 400 coupled to the pipe network 702.

Figure 8:
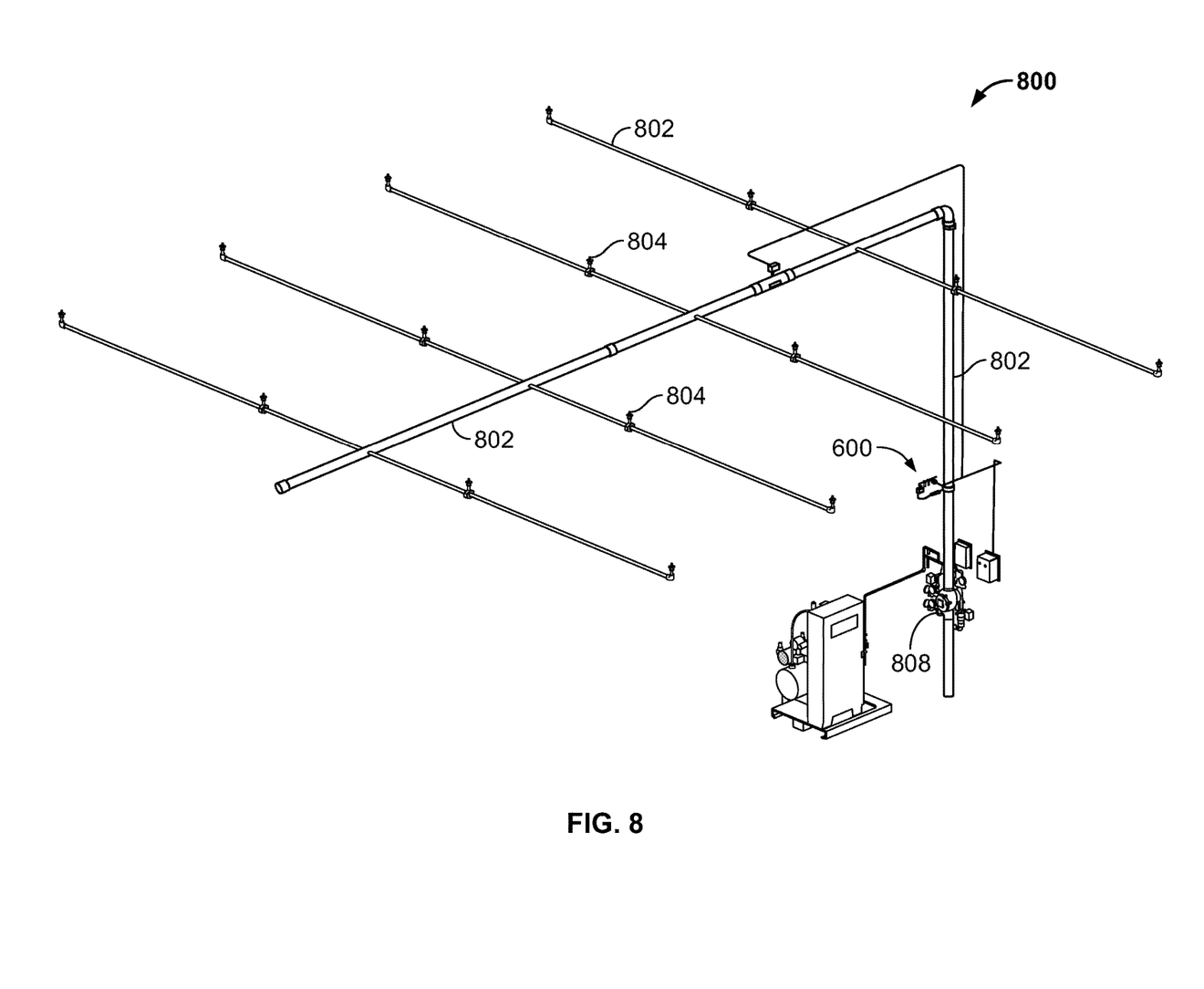
FIG. 8 is an isometric view of a dry pipe fire sprinkler system including the redundant vent of FIG. 6 according to another example embodiment.
Figure 9:
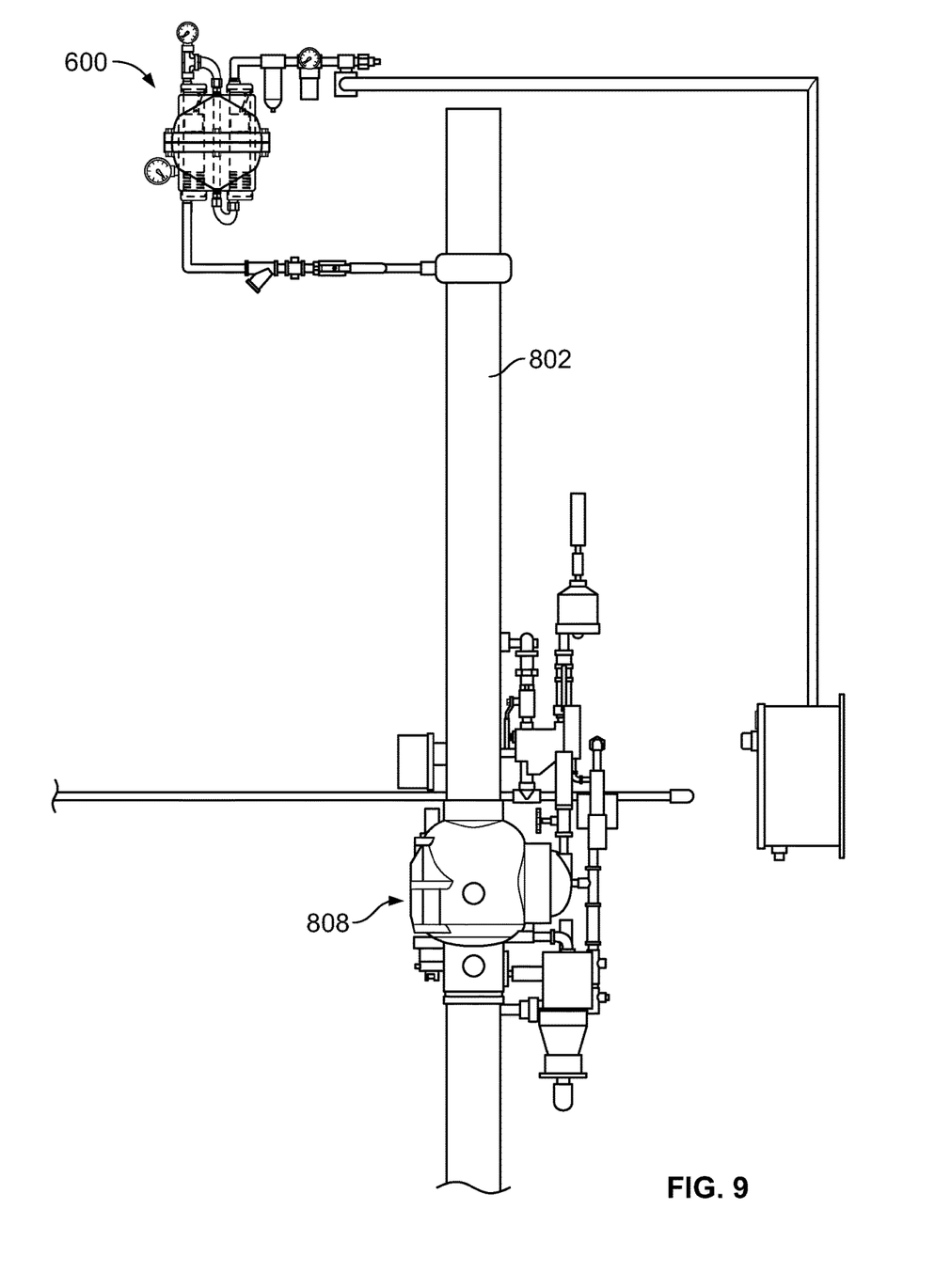
FIG. 9 is a front view of a portion of the dry pipe fire sprinkler system of FIG. 8.

FIGS. 8 and 9 illustrate one example of a dry pipe system 800 including a pipe network 802, various sprinklers 804 coupled to the pipe network 802, and the redundant vent 600 of FIG. 6 coupled to the pipe network 802. As shown in FIGS. 8 and 9, the dry pipe system 800 may be a preaction system having a preaction valve 808. Alternatively, the dry pipe system 800 may include a dry pipe valve.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A redundant vent for a water-based fire sprinkler system having a pipe network, the redundant vent comprising:
   a unitary valve body with a monolithic construction defining a primary valve chamber and a redundant valve chamber;
   a primary float valve positioned within the primary valve chamber, the primary float valve and the primary valve chamber forming a primary gas vent; and
   a redundant float valve positioned within the redundant valve chamber, the redundant float valve and the redundant valve chamber forming a redundant gas vent;
   wherein the primary gas vent is coupled to the redundant gas vent;
   wherein the primary gas vent is configured to vent gas but not water from the pipe network when the redundant vent is coupled to the pipe network; and
   wherein the redundant gas vent is configured to vent gas but not water from the pipe network when the redundant vent is coupled to the pipe network.

2. The redundant vent of claim 1 wherein the unitary valve body includes one or more cast portions.

3. The redundant vent of claim 1 wherein the unitary valve body includes one or more milled portions.

4. The redundant vent of claim 1 wherein the unitary valve body defines a connecting chamber coupled between the primary valve chamber and the redundant valve chamber.

5. The redundant vent of claim 1 further comprising a conduit coupling the primary gas vent and the redundant gas vent.

6. The redundant vent of claim 1 wherein the unitary valve body includes at least a first body portion and a second body portion detachably coupled to the first body portion.

7. The redundant vent of claim 6 wherein the unitary valve body has a two-piece construction including only the first body portion and the second body portion.

8. The redundant vent of claim 1 wherein the primary gas vent includes an inlet and an outlet.

9. The redundant vent of claim 8 further comprising a pressure gauge operatively coupled to the inlet of the primary gas vent.

10. The redundant vent of claim 8 further comprising a pressure gauge operatively coupled to the outlet of the primary gas vent.

11. A water-based fire sprinkler system including a pipe network and a redundant vent according to claim 1, the redundant vent coupled to the pipe network.

12. The water-based fire sprinkler system of claim 11, wherein the water-based fire sprinkler system is a wet pipe system.

13. The water-based fire sprinkler system of claim 11, wherein the water-based fire sprinkler system is a dry pipe system.

14. The water-based fire sprinkler system of claim 13, wherein the dry pipe system is a preaction system.

15. The redundant vent of claim 1 wherein the redundant gas vent includes an inlet and an outlet.

16. The redundant vent of claim 15 further comprising a gas sampling port operatively coupled to the outlet of the redundant gas vent.

17. The redundant vent of claim 15 further comprising a check valve operatively coupled to the outlet of the redundant gas vent to substantially inhibit ambient air from entering the outlet of the redundant gas vent.

18. The redundant vent of claim 17 wherein the check valve comprises a ball check valve.

19. The redundant vent of claim 17 wherein the check valve comprises a pressure relief valve.

20. The redundant vent of claim 17 wherein the check valve comprises an adjustable back pressure regulator.

21. A redundant vent for a water-based fire sprinkler system having a pipe network, the redundant vent comprising:
   a unitary valve body with a monolithic construction defining a primary valve chamber and a redundant valve chamber;

a primary float valve positioned within the primary valve chamber, the primary float valve and the primary valve chamber forming a primary gas vent; and a redundant float valve positioned within the redundant valve chamber, the redundant float valve and the redundant valve chamber forming a redundant gas vent;

wherein the primary gas vent is coupled to the redundant gas vent;

wherein the primary gas vent is configured to vent gas but not water from the pipe network when the redundant vent is coupled to the pipe network; and wherein the redundant gas vent is configured to vent gas but not water from the pipe network when the redundant vent is coupled to the pipe network.

22. A redundant vent for a water-based fire sprinkler system having a pipe network, the redundant vent comprising:

a unitary valve body with a monolithic construction defining a primary valve chamber and a redundant valve chamber, wherein the primary and redundant valve chambers are parallel to one another and oriented in a side-by-side configuration;

a primary float valve positioned within the primary valve chamber, the primary float valve and the primary valve chamber forming a primary gas vent; and a redundant float valve positioned within the redundant valve chamber, the redundant float valve and the redundant valve chamber forming a redundant gas vent;

wherein the primary gas vent is coupled to the redundant gas vent;

wherein the primary gas vent is configured to vent gas but not water from the pipe network when the redundant vent is coupled to the pipe network;

wherein the redundant gas vent is configured to vent gas but not water from the pipe network when the redundant vent is coupled to the pipe network; and a solenoid valve configured to selectively prevent discharge of gas from the vent.

* * * * *